(12) United States Patent
Sasaki et al.

(10) Patent No.: US 7,565,903 B2
(45) Date of Patent: Jul. 28, 2009

(54) OVEN

(75) Inventors: Shuichi Sasaki, Tokyo (JP); Shigeo Suzuki, Tokyo (JP)

(73) Assignee: Jamco Corporation, Tokyo (JP)

( * ) Notice: Subject to any disclaimer, the term of this patent is extended or adjusted under 35 U.S.C. 154(b) by 420 days.

(21) Appl. No.: 11/216,034

(22) Filed: Sep. 1, 2005

(65) Prior Publication Data

US 2006/0060181 A1 Mar. 23, 2006

(30) Foreign Application Priority Data

Sep. 6, 2004 (JP) ............................. 2004-258036

(51) Int. Cl.
*A47J 39/00* (2006.01)
*A47J 36/24* (2006.01)

(52) U.S. Cl. ................. 126/24; 126/21 A; 126/20.1; 126/20.2; 126/37 R; 219/386; 312/236; 417/2

(58) Field of Classification Search ............ 126/21 A, 126/24, 268, 20.1, 20.2, 37 R; 99/483; 219/386, 219/400, 402; 244/118.5; 417/2; 312/236; 165/48.1, 61; 361/697
See application file for complete search history.

(56) References Cited

U.S. PATENT DOCUMENTS

| | | | | |
|---|---|---|---|---|
| 2,948,798 A | * | 8/1960 | Ness | .......................... 219/387 |
| 2,994,760 A | * | 8/1961 | Pecoraro et al. | ............. 219/400 |
| 3,129,041 A | * | 4/1964 | Heckel, Jr. et al. | .......... 312/236 |
| 4,055,317 A | * | 10/1977 | Greiss | ..................... 244/118.5 |
| 4,920,948 A | * | 5/1990 | Koether et al. | ............ 126/21 A |
| 5,454,295 A | * | 10/1995 | Cox et al. | ................. 126/21 A |
| 6,257,832 B1 | * | 7/2001 | Lyszkowski et al. | ........... 417/2 |
| 6,600,288 B2 | * | 7/2003 | Durth et al. | ................. 318/629 |
| 6,914,219 B2 | * | 7/2005 | Kuhne | ........................ 219/400 |
| 7,098,555 B2 | * | 8/2006 | Glahn et al. | .................. 307/32 |

FOREIGN PATENT DOCUMENTS

| FR | 2 885 279 A1 | * | 12/2006 |
|---|---|---|---|
| JP | 2001-199399 | | 7/2001 |
| WO | WO 99-40827 | | 8/1999 |

* cited by examiner

*Primary Examiner*—Carl D Price
(74) *Attorney, Agent, or Firm*—Westerman, Hattori, Daniels & Adrian, LLP.

(57) ABSTRACT

The invention aims at reducing the beating noise generated from motors of equipments placed in a galley unit of an aircraft. A galley unit 1 of an aircraft includes a cabinet 10 formed of honeycomb panels and the like. The cabinet 10 has a counter 50 for cooking, and a compartment 20 formed under the counter 50 for storing service carts 30. A plurality of ovens 100 for heating warm dishes are provided above the counter 50. Each oven 100 has a fan motor for making the inner heat even. If all the fan motors of the ovens are driven at the same rotation frequency, a beating noise will be generated from the motor and amplified through the compartment 20. Therefore, the rotation frequencies of the fan motors are slightly varied.

4 Claims, 6 Drawing Sheets

OVEN

The present application is based on and claims priority of Japanese patent application No. 2004-258036 filed on Sep. 6, 2004, the entire contents of which are hereby incorporated by reference.

BACKGROUND OF THE INVENTION

1. Field of the Invention

The present invention relates to an oven provided in an aircraft.

2. Description of the Related Art

The galley unit provided in an aircraft includes a cabinet formed for example of honeycomb panels and various cooking equipments stored inside the cabinet.

Japanese Patent Application Laid-Open Publication No. 2001-199399 (patent document 1) discloses one example of a structure of a galley unit, and Japanese PCT Application Laid-Open Publication No. 2002-502649 (patent document 2) discloses a beverage cooking equipment provided inside the galley unit.

The power supplied to the galley unit from the aircraft is generally fed from an alternating-current (AC) power supply with a fixed cycle (for example, 400 Hz). However, there are plans to use a variable AC power supply with a frequency range of 360 Hz through 800 Hz, for example, in aircrafts to be developed in the future.

There are various equipments provided inside the galley unit including an oven unit for cooking, which is equipped with a fan for circulating the heat and moisture inside the unit and a motor for driving the fan.

Therefore, the oven unit requires a device for converting the frequency of the AC power being fed thereto in order to maintain the desirable motor rotation.

The galley unit is formed of panel members, and includes a compartment for storing a plurality of service carts and a space to which a plurality of oven units are arranged.

If all the fan motors equipped in the multiple oven units arranged in the galley rotate at uniform speed, the motors generate a so-called beating noise.

This beating noise is amplified into a very loud noise by the compartment housing the service carts functioning as a speaker box.

Galley units are usually placed close to passenger seats, and such loud noise will annoy the passengers, causing deterioration of the service provided to the passengers on the aircraft.

SUMMARY OF THE INVENTION

The present invention aims at providing an oven that solves the above-described problems of the prior art.

In order to achieve the object, the present invention provides a plurality of ovens arranged at an upper portion of a cabinet in a galley unit having a counter and formed of a panel member and a compartment formed to a lower portion of the cabinet for storing service carts, wherein each oven has a fan motor and a converting device for converting frequency of an input power supply so as to drive the fan motor, and the plurality of ovens comprises a means for driving the fan motors of the ovens at slightly varied rotation frequencies.

Generally, the input power supply is an alternating-current power supply having variable frequency.

The present invention prevents the generation of a beating noise from the fan motors of multiple ovens being driven at equal frequency, and thus enables to provide a quiet galley unit.

DETAILED DESCRIPTION OF THE PREFERRED EMBODIMENTS

Figure 1:
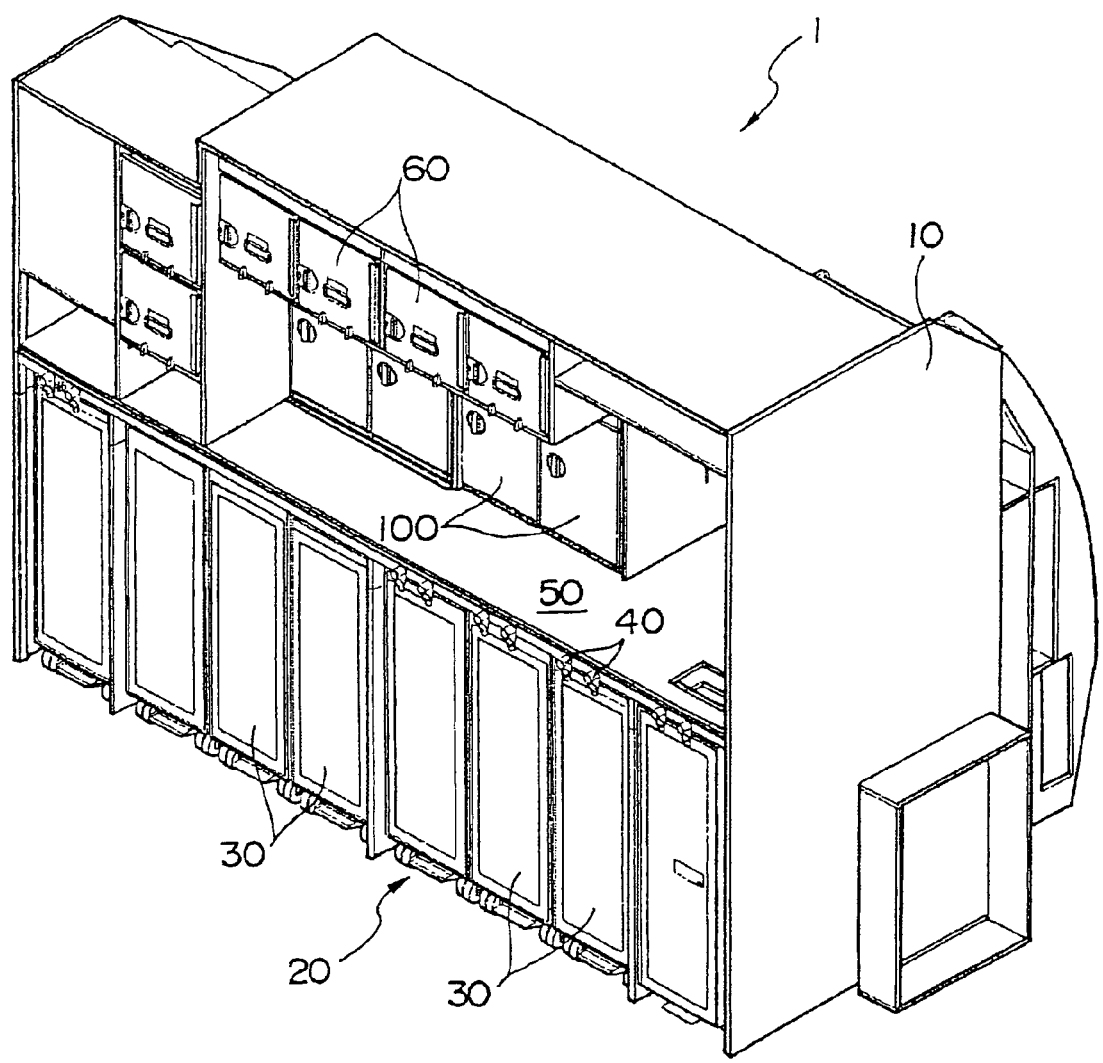
FIG. 1 is a perspective view of a galley unit according to the present invention.
Figure 2:
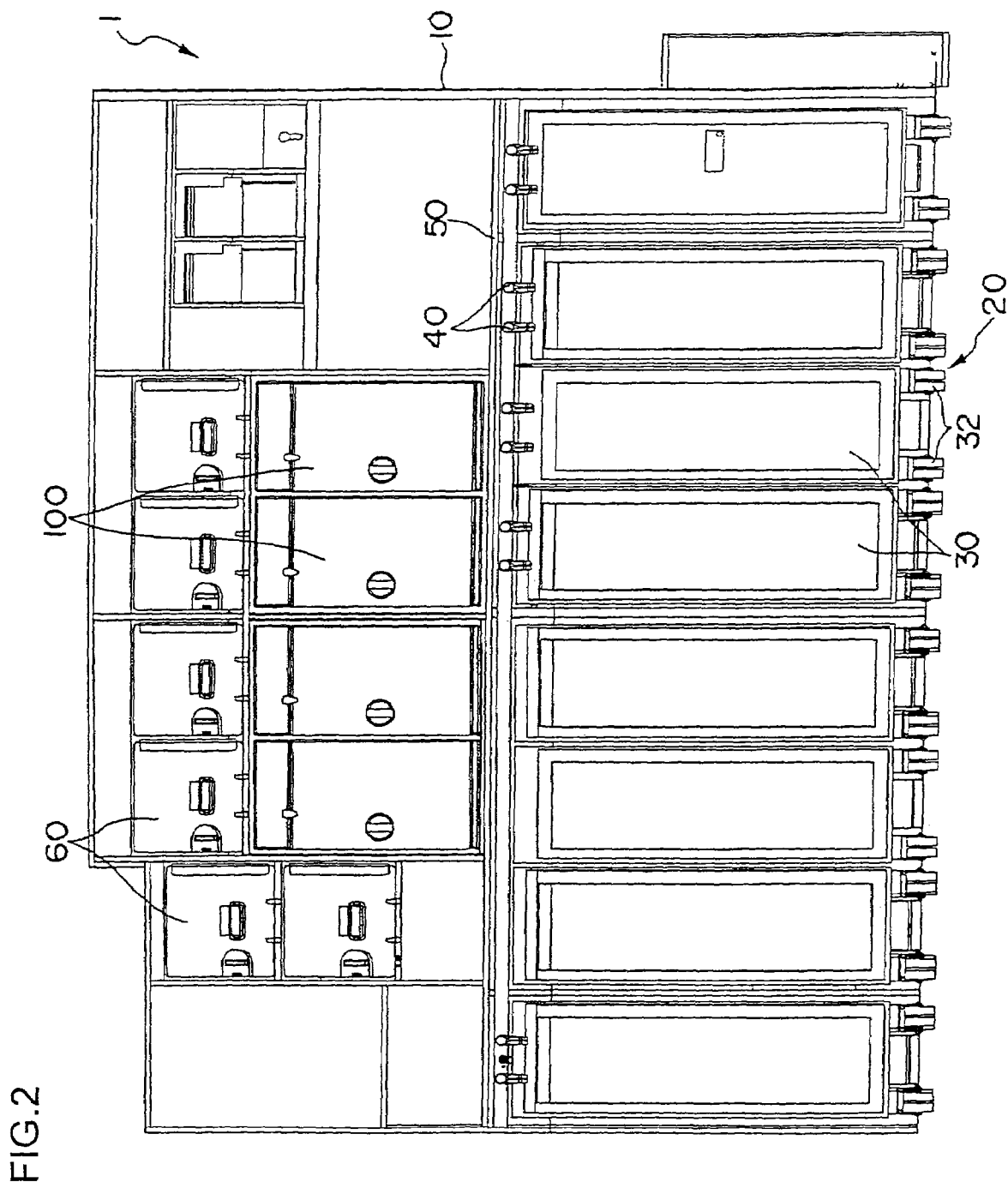
FIG. 2 is a front view of the galley unit according to the present invention.
Figure 3:
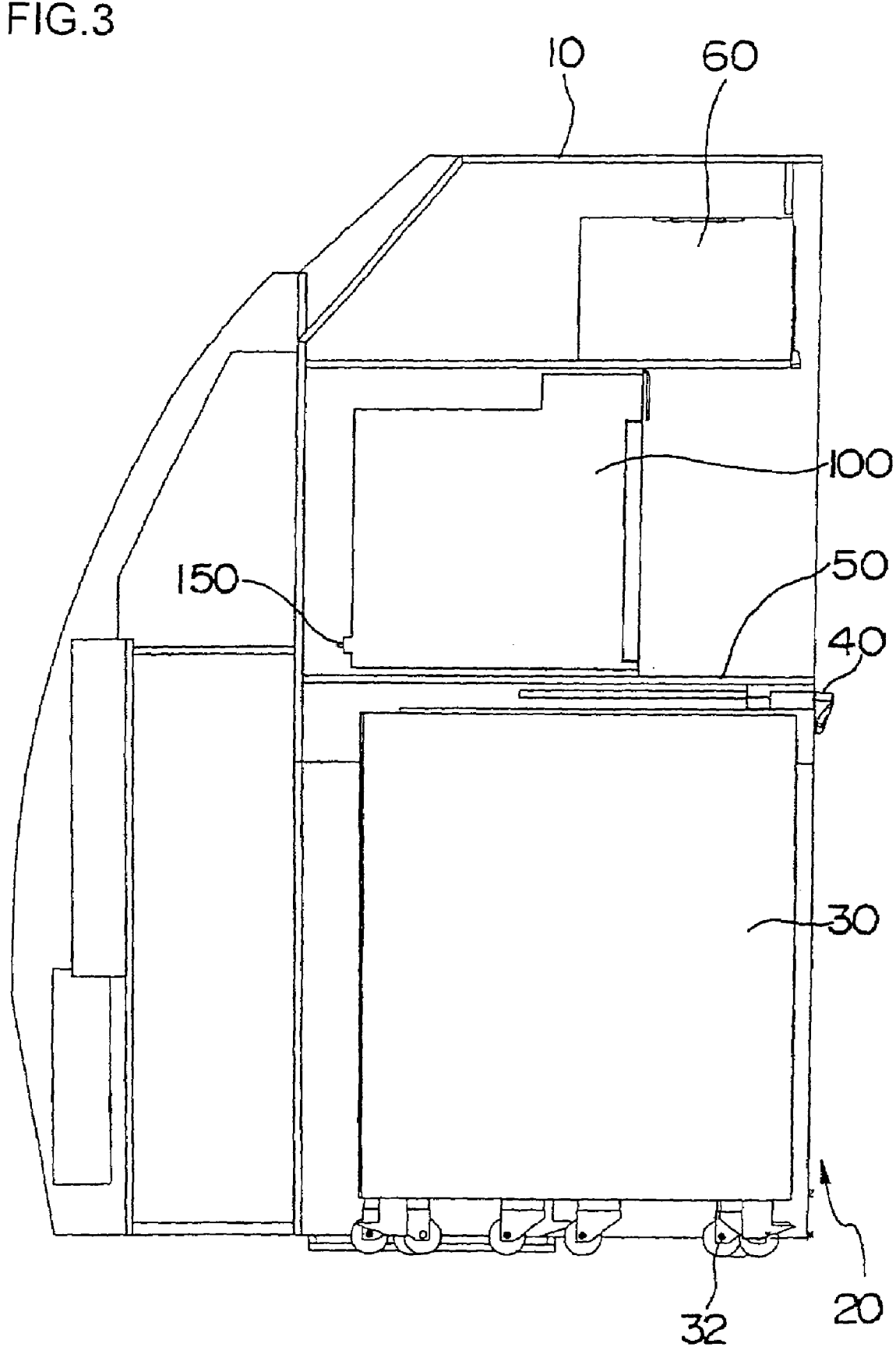
FIG. 3 is a left side view of the galley unit according to the present invention.

FIG. 1 is a perspective view of a galley unit to which the present invention is applied, FIG. 2 is a front view, and FIG. 3 is a left side view thereof.

A galley unit denoted as a whole by reference number 1 includes a cabinet 10 formed of honeycomb panel members. The cabinet 10 is designed to fit to the inner side of the body of the aircraft at which the galley unit 1 is positioned.

A compartment 20 for storing service carts is provided to the lower area of the cabinet 10, and multiple service carts 30 are stored therein. Each service cart 30 contains a number of meal trays prepared in advance, and when the cart is not used, it is fixed inside the compartment 20 by a stopper 40.

The service cart 30 has casters 32, and when in use, the cart is pulled out of the compartment 20 by cabin attendants to serve meals to passengers.

The service cart 30 has a rectangular front panel, so the compartment 20 storing the service carts 30 also has a rectangular opening at the front. The side and rear walls of the compartment 20 are formed of panel members.

According to the galley unit 1 of the present embodiment, the compartment 20 is designed to store eight service carts 30 in total.

The cabinet 10 of the galley unit 1 is equipped with a counter 50, and above the counter 50 in the cabinet 10 are provided various storages, cooking utensils 60, and ovens 100 for heating warm dishes.

There are two types of ovens being used in practice, a convection oven in which the air inside the oven is heated by a heater, and an oven in which a heater is used to generate vapor for heating the interior of the oven. In both ovens, a fan motor is provided to make the heat inside the oven even.

According to the present invention, four ovens 100 are provided in parallel. Each oven 100 is connected via a connector 150 provided on the rear side thereof to an electric circuit provided on the cabinet 10.

Figure 4:
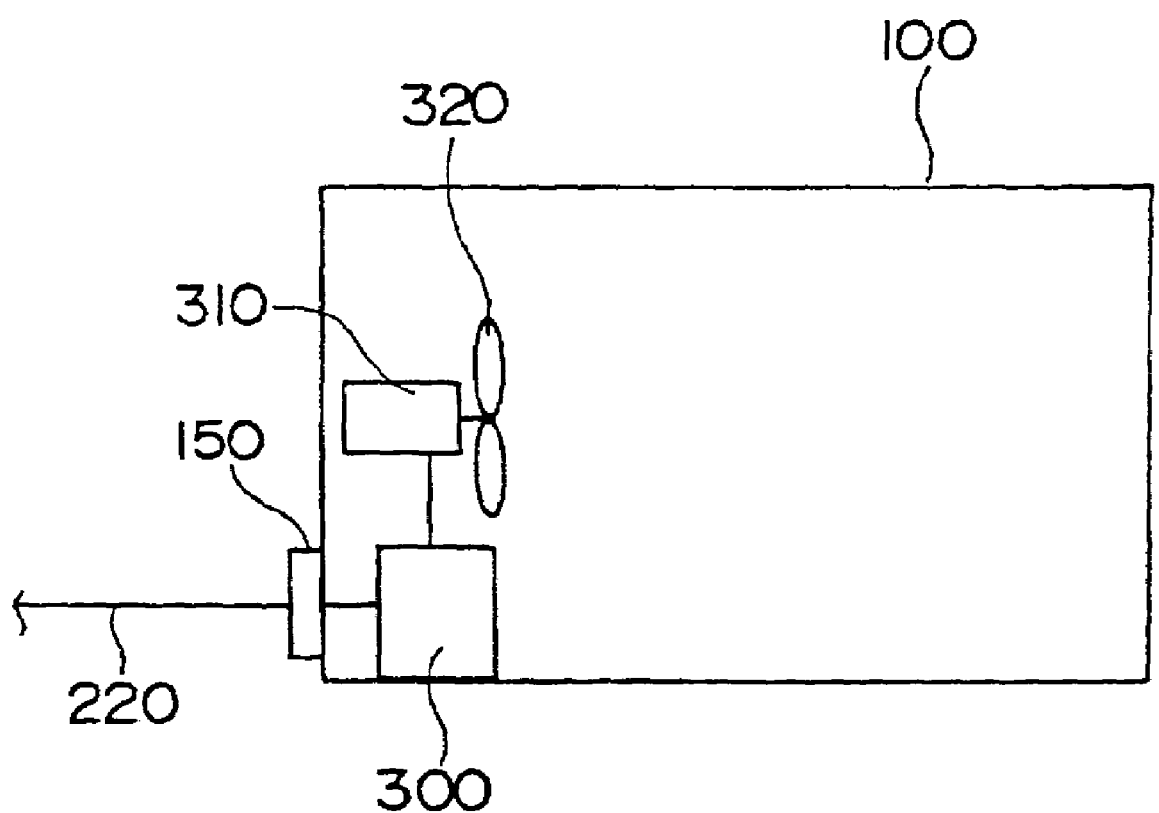
FIG. 4 is an explanatory view of an oven.

As shown in FIG. 4, the oven 100 is equipped with a converting device 300 for converting the input power fed through the connector 150, and the output from the converting device 300 is sent to the motor 310 to drive the fan 320.

Figure 5:
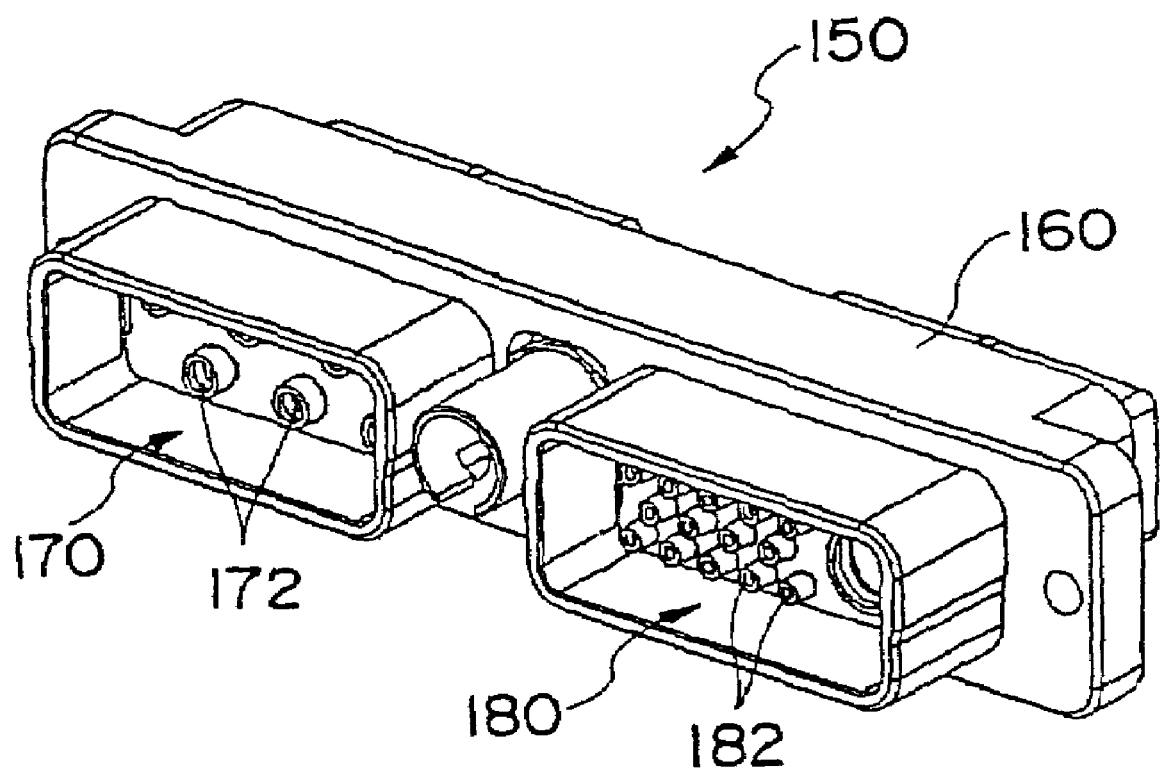
FIG. 5 is a perspective view of a connector.

FIG. 5 is a perspective view showing the outline of the connector.

The connector 150 has a terminal unit 170 for power and a terminal unit 180 for communication on a base 160. The power terminal unit 170 is equipped with, for example, six terminal pins 172. The communication terminal unit 180 is equipped with, for example, twenty terminal pins 182.

The power terminal unit 170 is used to feed power to the heater, the fan motor and the like in the oven 100, and the communication terminal unit 180 is used to communicate signals for controlling the heat, cooking time etc. of the oven.

Figure 6:
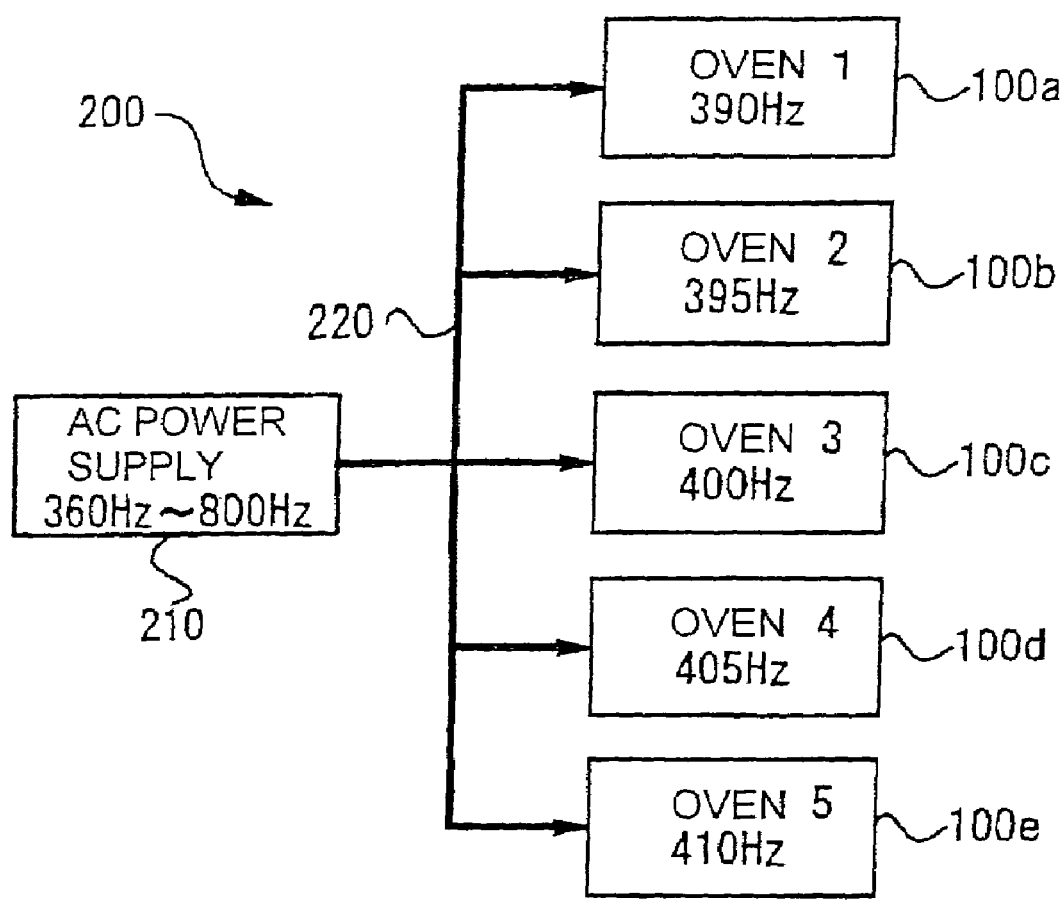
FIG. 6 is an explanatory view of a control circuit.

FIG. 6 is an explanatory view showing a control circuit according to the present invention.

The control circuit 200 has an AC power supply 210 fed from the generator on the aircraft. The AC power supply 210 has a variable frequency of 360 Hz through 800 Hz, for example.

The AC power supply 210 is connected to each oven via line 220. In FIG. 5, it is connected to five ovens 100a through 100e.

Each oven has a converter for converting the supplied variable frequency power to a given rotation frequency.

Each converter is set to convert power into a frequency different from that of the adjacently arranged oven to drive the fan motor. In the present embodiment, for example, the converter of oven 3 (100c) arranged at the center converts the input frequency to 400 Hz (standard frequency) to drive the fan motor.

With this oven 100c arranged at the center, oven 100b is set to drive its fan motor at 395 Hz, for example. Oven 100a is set to drive its fan motor at 390 Hz.

Similarly, oven 100d is set to drive its fan motor at 405 Hz, and oven 100e is set to drive its fan motor at 410 Hz.

As described, by slightly varying the rotation frequencies of the fan motors provided in the ovens arranged in parallel, it becomes possible to suppress the beating noise generated when multiple motors are driven at the same frequency.

Next, we will describe the means for providing different control signals to the ovens for varying the frequencies of the fan motors of the ovens.

The connector 150 used in the galley unit according to the present invention is equipped with approximately twenty communication terminal pins 182, as shown in FIG. 4.

Equipments such as the oven take up only a small number of channels for communication, so that some pins remain as spares.

It is possible to use three of the spare pins (pin A, pin B, pin C) to generate control patterns.

The patterns are as follows:

Pattern 1: Pins A, B and C are all connected.
Pattern 2: Pins A and B are connected and pin C is opened.
Pattern 3: Pins A and C are connected and pin B is opened.
Pattern 4: Pins B and C are connected and pin A is opened.
Pattern 5: Pins A, B and C are all opened.

Each oven automatically recognizes the above information and drives the motor by the frequency corresponding to the pattern.

By using the above-described means, the beating noise generated from the fan motors of multiple ovens disposed in the galley unit can be reduced.

Although the present embodiment is exemplified using ovens, the present invention can be applied to other equipments having motors in a similar manner.

Furthermore, spare pins of the communication terminal pins on the connector are used to generate control patterns in the present embodiment, but other means can be used to generate the control patterns.

In some types of aircrafts, DC power supply is used to geed power to the equipments on board. Similarly in such case, the beating noise of the motors can be reduced by slightly varying the motor frequencies of multiple equipments arranged in the galley unit.

What is claimed is:

1. An oven provided in an aircraft for reheating food placed in a galley unit, the galley unit comprising:
   a cabinet having a counter and formed of a panel member;
   a compartment formed to a lower portion of the cabinet for storing service carts; and
   a plurality of ovens arranged in an upper portion of the cabinet, wherein each oven is equipped with a fan motor and a converting device for converting frequency of an input power supply so as to drive the fan motor, and the plurality of ovens comprises a means for driving each one of the fan motors of the plurality of ovens at a slightly varied rotation frequency with respect to each of the other fan motors of the plurality of ovens.

2. The oven according to claim 1, wherein the input power supply is an alternating-current power supply having variable frequency.

3. The oven according to claim 1, wherein the rotational frequency of each of the fan motors provided in adjacent ovens is varied by 5 Hz.

4. The oven according to claim 1, wherein the plurality of ovens comprises:
   a first oven that has a fan motor that rotates at 390 Hz; and
   a second oven that has a fan motor that rotates at 395 Hz.

* * * * *